United States Patent
Xiao et al.

(10) Patent No.: US 11,493,693 B2
(45) Date of Patent: Nov. 8, 2022

(54) M-Z INTERFACE LIGHT PATH STRUCTURE WITH ALL POLARIZATION-MAINTAINING FUNCTION

(71) Applicant: Guangdong Fu'an Technology Development Co., LTD., Dongguan (CN)

(72) Inventors: Qian Xiao, Dongguan (CN); Bo Jia, Dongguan (CN); Pengwei Zhou, Dongguan (CN); Yongchao Chen, Dongguan (CN)

(73) Assignee: GUANGDONG FU'AN TECHNOLOGY DEVELOPMENT CO., LTD., Dongguan (CN)

( * ) Notice: Subject to any disclaimer, the term of this patent is extended or adjusted under 35 U.S.C. 154(b) by 505 days.

(21) Appl. No.: 16/627,757

(22) PCT Filed: Nov. 10, 2017

(86) PCT No.: PCT/CN2017/110507
§ 371 (c)(1),
(2) Date: Dec. 30, 2019

(87) PCT Pub. No.: WO2019/090706
PCT Pub. Date: May 16, 2019

(65) Prior Publication Data
US 2021/0165235 A1   Jun. 3, 2021

(30) Foreign Application Priority Data

Nov. 10, 2017   (CN) .......................... 201711107701.5

(51) Int. Cl.
*G02B 6/28*   (2006.01)
*G02F 1/21*   (2006.01)
(Continued)

(52) U.S. Cl.
CPC .......... *G02B 6/2843* (2013.01); *G02F 1/212* (2021.01); *G02B 27/283* (2013.01); *G02F 1/09* (2013.01)

(58) Field of Classification Search
None
See application file for complete search history.

(56) References Cited

U.S. PATENT DOCUMENTS 6,160,627 A    12/2000   Ahn et al.
6,678,211 B2 *  1/2004   Vakoc .................. G01S 3/80
                                          367/149
(Continued)

FOREIGN PATENT DOCUMENTS

CN   101183014 A   5/2008
CN   102564477 A   7/2012
(Continued)

*Primary Examiner* — Jerry Rahll
(74) *Attorney, Agent, or Firm* — Cheng-Ju Chiang (57) ABSTRACT

The application provides a interface light path structure with all polarization-maintaining function. A first polarization-maintaining-transferring device includes a first port, a second port, and a third port, wherein the first port receives a first polarized light output by the polarization beam-splitting device, the second port is connected to the first Faraday rotation mirror, and the third port is connected to a first port of the first polarization-maintaining coupler. A second polarization-maintaining-transferring device includes a first port, a second port, and a third port, wherein the first port receives a second polarized light output by the polarization beam-splitting device, the second port is connected to the second Faraday rotation mirror, and the third port is connected to a second port of the first polarization-maintaining coupler.

17 Claims, 2 Drawing Sheets

(51) Int. Cl.
 G02B 27/28 (2006.01)
 G02F 1/09 (2006.01)

(56) References Cited

U.S. PATENT DOCUMENTS

| | | | | |
|---|---|---|---|---|
| 6,862,130 | B2* | 3/2005 | Batchko | G02F 2/004 |
| | | | | 385/11 |
| 2002/0101650 | A1* | 8/2002 | King | H01S 3/06758 |
| | | | | 359/337 |
| 2002/0179912 | A1* | 12/2002 | Batchko | G02F 2/004 |
| | | | | 257/79 |
| 2003/0043696 | A1* | 3/2003 | Vakoc | G01H 9/00 |
| | | | | 367/149 |
| 2021/0165235 | A1* | 6/2021 | Xiao | G02B 6/29352 |

FOREIGN PATENT DOCUMENTS

| | | |
|---|---|---|
| CN | 202649279 U | 1/2013 |
| CN | 102928198 A | 2/2013 |
| CN | 107741244 A | 2/2018 |
| CN | 207423216 U | 5/2018 |
| EP | 0482461 A1 | 4/1992 |

* cited by examiner

FIG. 4

M-Z INTERFACE LIGHT PATH STRUCTURE WITH ALL POLARIZATION-MAINTAINING FUNCTION

CROSS REFERENCE TO RELATED APPLICATION

The present application is a 35 U.S.C. § 371 National Phase conversion of International (PCT) Patent Application No. PCT/CN2017/110507, filed on Nov. 10, 2017, which is based on and claims priority of Chinese Patent Application No. 201711107701.5, filed on Nov. 10, 2017. The entire disclosure of the above-identified application, including the specification, drawings and claims are incorporated herein by reference in its entirety. The PCT Application was published and filed in Chinese.

FIELD OF THE INVENTION

The invention relates to the field of fiber sensing technology, and in particular relates to a M-Z interface light path structure with all polarization-maintaining function.

BACKGROUND OF THE INVENTION

Figure 1:
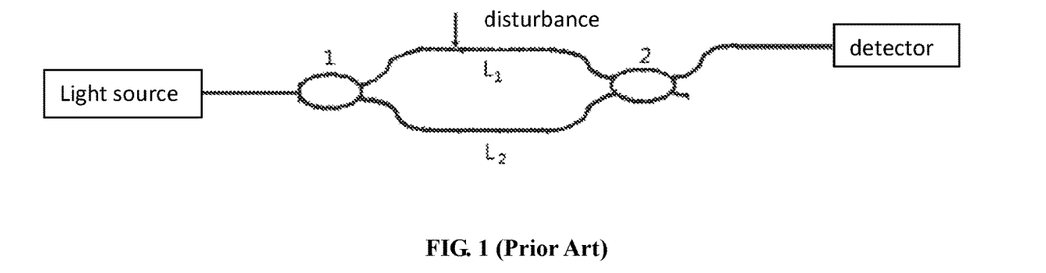
FIG. 1 is a prior art Mach-Zehnder interference optical path structure.

With the development of fiber technology, fiber sensing technology has been paid more attention to more and more application fields, among which the MZ (Mach-Zehnder) interference structure is a common sensing technology and is often used in fibers. Perimeter and other vibration detection technologies (Reference: Laser and Infrared, Zhu, Yan, Dai, Zhiyong, distributed fiber vibration sensing technology and development, 2011, 10, P1072), the specific structure shown in FIG. 1, in which L1 and L2 are single-mode fibers. The first coupler 1 splits the light emitted from the light source into two paths and injects the single-mode fibers L1 and L2 respectively. The light transmitted through the single-mode fibers L1 and L2 merges at the second coupler 2, and then interference occurs and the interference signal is detected by the detector. In this structure, single-mode fibers L1 and/or L2 are sensing fibers. When an external disturbance acts on a sensing fiber, such as single-mode fiber L1, it will cause a change in the light path length, and then through interference, the change in the light path length changes to a change in the intensity of the interference light, thus enabling the monitoring of the line disturbance.

Although the above-mentioned M-Z interference structure is simple to implement, because the polarization characteristics of the single-mode fiber are easily influenced by external environmental factors, the polarization state of the two beams reach the second coupler 2 through the single-mode fibers L1 and L2 is random, so the polarization state of the interference-forming light is also constantly changing. In extreme cases, when the two polarization states are orthogonal to each other, the two beams will not interfere with each other. No interference signal will be detected. Therefore, this type of M-Z structure using single-mode fibers often suffers from serious errors and omissions due to poor polarization stability. From the optical knowledge, it can be seen that if polarization-maintaining fibers are used to constitute an all polarization-maintaining structure, the problem of poor polarization stability can be solved. However, due to the cost factor of polarization-maintaining fibers, the availability of the technology is reduced. At the same time, the technology cannot use the already installed good communication cable to realize sensing, which is not suitable for distributed fiber sensing. In the distributed fiber sensing technology, in order to ensure the practicality of the technology, single mode fibers commonly used in communications are still used as sensing fibers. For example, in the oil and gas pipeline safety monitoring technology, single mode optical cables laid along oil and gas pipelines are utilized to achieve sensing.

Technical Question

The polarization characteristics of the single-mode fiber are easily influenced by external environmental factors, the polarization state of the two beams reach the second coupler 2 through the single-mode fibers L1 and L2 is random, so the polarization state of the interference-forming light is also constantly changing. In extreme cases, when the two polarization states are orthogonal to each other, the two beams will not interfere with each other. No interference signal will be detected. Therefore, this type of M-Z structure using single-mode fibers often suffers from serious errors and omissions due to poor polarization stability. From the optical knowledge, it can be seen that if polarization-maintaining fibers are used to constitute an all polarization-maintaining structure, the problem of poor polarization stability can be solved. However, due to the cost factor of polarization-maintaining fibers, the availability of the technology is reduced. At the same time, the technology cannot use the already installed good communication cable to realize sensing, which is not suitable for distributed fiber sensing. In the distributed fiber sensing technology, in order to ensure the practicality of the technology, single mode fibers commonly used in communications are still used as sensing fibers. For example, in the oil and gas pipeline safety monitoring technology, single mode optical cables laid along oil and gas pipelines are utilized to achieve sensing.

THE SOLUTION TO THE PROBLEM

Technical Solutions

In view of the disadvantages of the above-mentioned prior art, the purpose of the present invention is to provide a M-Z interface light path structure with all polarization-maintaining function, which is configured to solve the problem that the polarization stability is poor due to the polarization susceptibility of the single-mode fiber which causes the sensing cannot be realized.

In order to achieve the above and other related purposes, the present invention provides a M-Z interface light path structure with all polarization-maintaining function, including a polarization beam-splitting device, a first polarization-maintaining-transferring device, a first faraday rotator mirror, and a second polarization-maintaining-transferring device, a second faraday rotator mirror, a First polarization-maintaining coupler; the polarization beam-splitting device configured to receive light input by a light source and output a first polarized light and a second polarized light with the same polarization state; the first polarization-maintaining-transferring device including a first port, a second port, and a third port, the first port of the first polarization-maintaining-transferring device receiving the first polarized light output by the polarization beam-splitting device, the second port of the first polarization-maintaining-transferring device is connected to the first faraday rotator mirror, and the third port of the first polarization-maintaining-transferring device connected to a first port of the first polarization-maintaining coupler, wherein fiber connected between the first port of the first polarization-maintaining-transferring device and the polarization beam-splitting device, and fiber connected between the third port of the polarization-maintaining-transferring device and the first port of the first polarization-maintaining coupler are polarization-maintaining fiber; the second polarization-maintaining-transferring device including a first port, a second port, and a third port, and the first port of the second polarization-maintaining-transferring device receiving the second polarized light output by the polarization beam-splitting device, the second port of the second polarization-maintaining-transferring device connected to the second faraday rotator mirror, and the third port of the second polarization-maintaining-transferring device connected to a second port of the first polarization-maintaining coupler, wherein fiber connected between the first port of the second polarization-maintaining-transferring device and the polarization beam-splitting device, and fiber connected between the third port of the polarization-maintaining-transferring device and the second port of the first polarization-maintaining coupler are polarization-maintaining fiber.

Further, the M-Z interface light path structure further includes an injection fiber, the light input by the light source is linearly polarized light, the injection fiber is a polarization-maintaining fiber, and the linearly polarized light is input to the polarization beam-splitting device along the polarization main axis of the working main axis of the injection fiber.

Further, the polarization beam-splitting device is a polarization-maintaining beam-splitting device.

Further, the polarization beam-splitting device is a polarization-maintaining coupling device.

Further, the polarization beam-splitting device is a polarization-maintaining coupling device working in a single axis or two axes.

Further, both the first polarization-maintaining-transferring device and the second polarization-maintaining-transferring device are polarization beam-splitting devices, the first port and the third port of the first polarization-maintaining-transferring device are demultiplexing ports, and the second port of the first polarization-maintaining-transferring device is a multiplexing port, the first port and the third port of the second polarization-maintaining-transferring device are demultiplexing ports, and the second port of the second polarization-maintaining-transferring device is a demultiplexing port.

Further, the first polarization-maintaining-transferring device and the second polarization-maintaining-transferring device both adopt 90° polarization-maintaining fusion.

Further, the first polarization-maintaining-transferring device includes a first polarization-maintaining circulator and a first polarizer, a first port of the first polarization-maintaining circulator receives the first polarized light output by the polarization beam-splitting device, and a second port of the first polarization-maintaining circulator is connected to the first faraday rotator mirror, and a third port of the first polarization-maintaining circulator is connected to the first polarizer, the first polarizer is connected to the first port of the first polarization-maintaining coupler, wherein fiber connected between the first port of the first polarization-maintaining circulator and the polarization beam-splitting device, fiber connected between the third port of the first polarization-maintaining circulator and the first polarizer, and fiber connected between the first polarizer and the first port of the first polarization-maintaining coupler are the polarization-maintaining fiber; the second polarization-maintaining-transferring device includes a second polarization-maintaining circulator, a second polarizer, and a first port of the second polarization-maintaining circulator receives the second polarized light output by the polarization beam-splitting light device, a second port of the second polarization-maintaining circulator is connected to the second faraday rotator mirror, and a third port of the second polarization-maintaining circulator is connected to the second polarizer, and the second polarizer is connected to the second port of the first polarization-maintaining coupler, wherein fiber connected between the first port of the second polarization-maintaining circulator and the polarization beam-splitting device, fiber connected between the third port of the second polarization-maintaining circulator and the second polarizer, and fiber connected between the second polarizer and the second port of the first polarization-maintaining coupler are the polarization-maintaining fiber.

Further, fiber connected between the second port of the first polarization-maintaining-transferring device and the first faraday rotator mirror, fiber connected between the second port of the second polarization-maintaining-transferring device and the second faraday mirror are wrapped by sensor cable (16).

Further, the first polarization-maintaining coupler (8) is two or more polarization-maintaining fiber coupler.

BENEFICIAL EFFECTS OF THE INVENTION

Beneficial Effects

The M-Z interface light path structure with all polarization-maintaining function of the present invention has the following beneficial effects:

(1) using the characteristics of polarization-maintaining fiber, an M-Z light path structure with an all polarization-maintaining function is realized in the presence of single-mode fibers in the interference light path;

(2) the coherent beam has high polarization uniformity, high interference fringe resolution, and high measurement sensitivity and accuracy;

(3) the interference beam adopts a single polarization mode of operation, which can partly eliminate the influence of backscattered light in the fiber path;

(4) due to the use of single-mode fibers, the single-mode fibers can be used as sensing fibers. In particular, it is possible to use a paved communication fiber cable for sensing, which has strong applicability and is easy to popularize and apply the technology.

The invention is particularly suitable for long-distance distributed fiber sensing, for example, can be used for the monitoring of fiber communication trunks, long-distance perimeters, security monitoring of oil and gas pipelines and other fields.

Among them, L1 and L2 are single-mode fibers, 1 is a first coupler, 2 is a second coupler, 3 is a polarization beam-splitting device, 4 is a first polarization-maintaining-transferring device, 5 is a first faraday rotator mirror, and 6 is the second polarization-maintaining-transferring devices, 7 is the second faraday rotator mirror, 8 is the first polarization-maintaining coupler, 9 is the injection fiber of 3, which is polarization-maintaining fiber; 10 is the fiber between the polarization beam-splitting device 3 and the first polarization-maintaining-transferring device 4; 11 is the fiber between the first polarization-maintaining-transferring device 4 and the first polarization-maintaining coupler 8; 12 is the fiber between the polarization beam-splitting device 3 and the second polarization-maintaining-transferring device 6; 13 is the fiber between second polarization-maintaining-transferring device 6 and the first polarization-maintaining coupler 8; 14 is the fiber between the first polarization-maintaining-transferring device 4 and the first faraday rotator mirror 5; 15 is the fiber between the second polarization-maintaining-transferring device 6 and the second faraday rotator mirrors 7; 41 is the first polarization-maintaining circulator, 61 is the second polarization-maintaining circulator, 42 is the first polarizer, 62 is the second polarizer; 111 is the fiber between the first polarization-maintaining circulator and the first polarizer 42; 131 is the fiber between the second polarization-maintaining circulator 61 and the second polarizer 62; 112 is the fiber between the first polarization-maintaining coupler 8 and the first polarizer 42; 132 is the fiber between the first polarization-maintaining coupler 8 and the second polarizer 62; 16 is the sensor cable; and 17 is the outputting fiber of the first polarization-maintaining coupler 8.

EMBODIMENTS OF THE INVENTION

The Embodiment of the Invention

Figure 2:
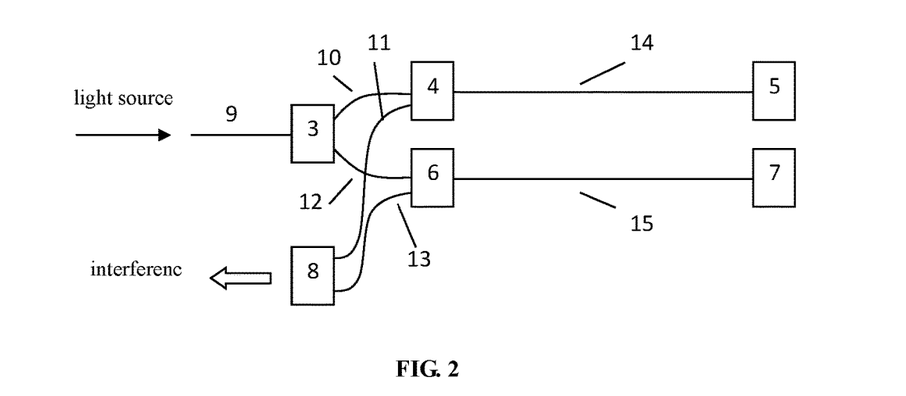
FIG. 2 is a M-Z interface light path structure with all polarization-maintaining function according to the first embodiment of the present invention.

FIG. 2 is the M-Z interface light path structure of the first embodiment of the present invention. As shown in FIG. 2, the M-Z interface light path structure of the first embodiment of the present invention includes a polarization beam-splitting device 3, a first polarization-maintaining-transferring device 4, a first faraday rotator mirror 5, a second polarization-maintaining-transferring device 6, and a second faraday rotation mirror 7, first polarization-maintaining coupler 8.

In an embodiment, the polarization beam-splitting device 3 may be, but not limited to, a polarization-maintaining beam-splitting device, or a polarization-maintaining coupling device working in a single axis or two axes, and/or the first polarization-maintaining-transferring device 4 may be but not limited to a polarization beam-splitting device or a polarization-maintaining circulator, and/or the first polarization-maintaining-transferring device 6 may be but is not limited to a polarization beam-splitting device, a polarization-maintaining circulator, and/or the first polarization-maintaining coupling device 8 can be, but is not limited to, two-way polarization-maintaining fiber couplers or multiple-way polarization-maintaining fiber couplers. When the first polarization-maintaining-transferring device 4 is a polarization beam-splitting device, the first port and the third port of the first polarization-maintaining-transferring device 4 are demultiplexing ports, and the second port of the first polarization-maintaining-transferring device 4 is a multiplexing port. When the second polarization-maintaining-transferring device 6 is a polarization beam-splitting device, the first port and third port of the second polarization-maintaining-transferring device 6 are demultiplexing ports, and the second port of the second polarization-maintaining-transferring device 6 is a multiplexing port.

In one embodiment, the M-Z interface light path structure further includes an injection fiber 9, the light input by the light source is linearly polarized light, the injection fiber 9 is a polarization-maintaining fiber, and the linearly polarized light is input to the polarization beam-splitting device 3 along the polarization main axis of the working main axis of the injection fiber 9, since the injection fiber 9 is a polarization-maintaining fiber, the polarization direction of the linearly polarized light in the injection fiber 9 remains unchanged.

The first polarization-maintaining-transferring device 4 includes a first port, a second port, and a third port. The first port of the first polarization-maintaining-transferring device 4 receives the first polarized light output by the polarization beam-splitting device 3, and the second port of the first polarization-maintaining-transferring device 4 is connected to the first faraday rotator mirror 5, and the third port of the first polarization-maintaining-transferring device 4 is connected to the first port of the first polarization-control coupler 8, wherein the fiber 10 connected between the first port of the first polarization-maintaining-transferring device 4 and the polarization beam-splitting device 3, and the fiber 11 connected between the third port of the polarization-maintaining-transferring device 4 and the first port of the first polarization-maintaining coupler 8 are polarization-maintaining fiber. The second polarization-maintaining-transferring device 6 includes a first port, a second port, and a third port, and the first port of the second polarization-maintaining-transferring device 6 receives the second polarized light output by the polarization beam-splitting device 3, the second port of the second polarization-maintaining-transferring device 6 is connected to the second faraday rotator mirror 7, and the third port of the second polarization-maintaining-transferring device 6 is connected to a second port of the first polarization-maintaining coupler 8, wherein the fiber connected between the first port of the second polarization-maintaining-transferring device 6 and the polarization beam-splitting device 3, and fiber connected between the third port of the polarization-maintaining-transferring device 6 and the second port of the first polarization-maintaining coupler 8 are polarization-maintaining fiber.

Wherein, the polarization beam-splitting device 3 is configured to receive the light input by the light source and output the first polarized light and the second polarized light with the same polarization state. The polarization beam-splitting device 3 is a polarized beam-splitter for obtaining two polarized lights with the same polarization state, but the present invention is not limited thereto. The polarization beam-splitting device 3 may also be a device for obtaining multiple beams with a determined polarization state.

The first polarization-maintaining-transferring device 4 has function that the light input from the first port output only from the second port, and the light input from the second port can be output only from the third port; the second polarization-maintaining-transferring device 6 has function that the light input from the first port can be output only from the second port, the light input from the second port can be only output from the third port.

Specifically, when the light source is input to the polarization beam-splitting device 3, the polarization beam-splitting device 3 obtains polarized lights with uniform polarization states by polarization splitting. The two polarized lights are the first polarized light and the second polarized light, respectively. The first polarized light is firstly input to the first port of the first polarization-maintaining-transferring device 4 through the fiber 10, and the fiber 10 is the polarization-maintaining fiber, and the polarization direction of the first polarized light in the fiber 10 remains unchanged. The first polarized light is output from the second port of the first polarization-maintaining-transferring device 4, and is transmitted to the faraday rotator mirror 5 through the fiber 14 connected between the second port of the first polarization-maintaining-transferring device 4 and the faraday rotator mirror 5, and then returned to the second port of the first polarization-maintaining-transferring device 4 by the fiber 14 through the original path after being reflected by the faraday rotator mirror 5. Wherein, when the first polarized light is transmitted to the faraday rotator 5 and reflected from the faraday rotator 5, the polarization direction of the first polarized light is rotated by 90 degrees, and the first polarized light is returned by the original path in the fiber 14, so whatever the polarization direction of the polarized light generated during the transmission of the fiber 14 changes, the polarization direction of the first polarized light output and input from the second port of the first polarization-maintaining-transferring device 4 changes by only 90 degrees, that is, the single-mode fiber may be used for the fiber 14, and even if the first polarized light changes the polarization direction in the fiber 14 under the influence of the external environment, the polarization direction of the polarized light is fixedly changed by 90 degrees when it is output from the second port of the first polarization-maintaining-transferring device 4 and returns to the second port of the first polarization-maintaining-transferring device 4. Therefore, the fiber 14 does not affect the relative stability of the polarization state of the first polarized light when input to the fiber 14 and the output from the fiber 14, even if the fiber 14 is a single-mode fiber.

Similarly, the second polarized light is input to the first port of the second polarization-maintaining-transferring device 6 through the fiber 12, and the fiber 12 is the polarization-maintaining fiber, and the polarization state of the second polarized light in the fiber 12 remains unchanged. The second port of the second polarization-maintaining-transferring device 6 outputs the second polarized light, and is transmitted to the faraday rotator mirror 7 through the fiber 15 connected between the second port of the second polarization-maintaining-transferring device 6 and the faraday rotator mirror 7. The second polarized light reflected by the faraday rotator mirror 7 is returned to the second port of the second polarization-maintaining-transferring device 6 through the original path of the fiber 15. Wherein, when the second polarized light is reflected and output from the faraday rotator mirror 7 and transmitted to the faraday rotator mirror 7, its polarization direction is rotated by 90 degrees, and the second polarized light is returned in the fiber 15 in the original path, so no matter how the polarization direction of a polarized light produced during the transmission of the fiber 15 changes, and the polarization direction of the second polarized light output and input from the second port of the second polarization-maintaining-transferring device 6 changes by only 90 degrees. That is, the fiber 15 may be a single-mode fiber, and even if the second polarized light changes the polarization direction in the fiber 15 under the influence of the external environment, when the second polarized light returns to the second port of the second polarization-maintaining-transferring device 6 and output from the second port of the second polarization-maintaining-transferring device 6, the polarization direction of the polarized light is fixedly changed by 90 degrees. Therefore, the fiber 15 does not affect the relative stability of the polarization state of the second polarized light when input to the fiber 15 and the output from the fiber 15, even if the fiber 15 is a single-mode fiber.

Then, the first polarized light output from the third port of the first polarization-maintaining-transferring device 4 is input to the first polarization-maintaining coupler 8 through the fiber 11, and the second polarized light output from the third port of the second polarization-maintaining-transferring device 6 is input to the first polarization-maintaining coupler 8 through the fiber 13. Wherein, the fiber 11 and the fiber 13 are polarization-maintaining fibers, the polarization direction of the first polarized light in the fiber 11 remains unchanged, and the polarization direction of the second polarized light in the fiber 13 remains unchanged. The first polarized light and the second polarized light have the same polarization state and interfere at the first polarization-maintaining coupler 8, and the interference signal can be detected by the detector.

Among them, the fiber 10, the fiber 11, the fiber 12, and the fiber 13 are all polarization-maintaining fibers and thus they can maintain the polarization of the polarized light of which incident direction is the same with the polarization main axis of the fiber. The first polarized light and the second polarized light are transmitted along the polarization main axis, if the polarization main axis in the direction of the corresponding polarization main axis is the working main axis when the first polarized light is transmitted in the fiber 10, the second polarized light is also transmitted along the working main axis in the fiber 12. The polarization state of the polarized light polarized in the direction of the working main axis is assumed to be the vertical polarization state, denoted by "⊥", and the polarization state orthogonal to the vertical polarization state is the horizontal polarization, which is denoted by "∥". When the first polarized light is transmitted to the first port of the first polarization-maintaining-transferring device 4, the first polarized light is vertically polarized. When the first polarized light is returned from the faraday rotator mirror 5 to the second port of the first polarization-maintaining-transferring device 4, the polarization direction of the first polarized light is rotated by 90 degrees with respect to when it is input to the first port of the first polarization-maintaining-transferring device 4, that is horizontal polarization. When the first polarized light is output from the third port of the first polarization-maintaining-transferring device 4, the first polarized light is horizontally polarized. Similarly, when the second polarized light is transmitted to the first port of the second polarization-maintaining-transferring device 6, the second polarized light is vertically polarized. When the second polarized light is returned from the faraday rotatory mirror 7 to the second port of the second polarization-maintaining-transferring device 6, the polarization direction of the second polarized light is rotated by 90 degrees with respect to when the second polarized light is input to the first port of the second polarization-maintaining-transferring device 6, that is, it is the horizontal polarization; when the second polarized light is transmitted from the second polarization-maintaining-transferring device 6, the polarization direction of the second polarized light is horizontal polarization. The first polarized light is input to the first polarization-maintaining coupler 8 through the fiber 11, and the second polarized light is input to the first polarization-preventing coupler 8 through the fiber 13, so the first polarized light and the second polarized light input to the first polarization-control coupler 8 have the same polarization state and are horizontally polarized. The first polarized light and the second polarized light interfere at the first polarization-maintaining coupler 8, and the interference signal can be detected by the detector.

In one embodiment, in order to transmit the polarized light along the working main axis, the polarization-maintaining fiber may adopt 0° or 90° polarization-maintaining fusion. Specifically, a linearly polarized light having vertically polarized is injected along a polarization main axis of a working main axis of the injection fiber 9, and the fiber 14 and the fiber 15 are single-mode fibers. The first polarization-maintaining-transferring device 4 and the second polarization-maintaining-transferring device 6 are polarization beam-splitting devices, so when the first polarized light is output from the third port of the first polarization-maintaining-transferring device 4, the first polarized light is horizontally polarized, so that in order to making the first polarized light always transmitted along the working main axis, the third port of the first polarization-maintaining-transferring device 4 and the fiber 11 adopt 90° polarization-maintaining fusion. Similarly, when the second polarized light is output from the third port of the second polarization-maintaining-transferring device 6, the second polarized light is horizontally polarized, so that in order to making the second polarized light always transmitted along the working main axis, the third port of the second polarization-maintaining-transferring device 6 and the fiber 13 adopt 90° polarization-maintaining fusion. Therefore, the first polarized light and the second polarized light input to the first polarization-maintaining coupler 8 have the same polarization state and are all vertically polarized, and the first polarized light and the second polarized light interfere at the first polarization-preventing coupler 8. Interference signal can be detected by the detector. The polarization changes of the first polarized light and the second polarized light are as follows:

I: Injection fiber 9 (⊥)→Polarization beam-splitting device 3 (⊥)→Fiber 10 (⊥)→First polarization-maintaining-transferring 4 (⊥)→Fiber 14 (⊥ or random)→First faraday rotator mirror 5 (random)→Fibre 14 (random)→First polarization-maintaining-transferring device 4 (∥)→Fiber 11 (⊥)→First polarization-maintaining coupler 8 (⊥)

II: Injection fiber 9 (⊥)→Polarization beam-splitting device 3 (⊥)→Fiber 12 (⊥)→Second polarization-maintaining-transferring device 6 (⊥)→Fiber 15 (⊥ or random)→Second faraday rotator mirror 7 (random)→Fiber 15 (random)→Second polarization-maintaining-transferring 6 (∥)→Fiber 13 (⊥)→First polarization-maintaining coupler 8 (⊥)

It can be seen that, in the entire light transmission process, except for the light in the fiber 14, the fiber 15, the first polarization-maintaining-transferring device 4, and the second polarization-maintaining-transferring device 6, the rest of the light is transmitted along the working main axis of the polarization-maintaining fiber to ensure the polarization state of the light is uniform when finally returning to the first polarization-maintaining coupler 8; at the same time, since the single polarization state of the light at the time of coherent light beam convergence is ensured, the back scattered light direction from the sensor fiber path can be eliminated to some extent.

The first embodiment of the present invention uses a combination of a single-mode fiber and a faraday rotator to eliminate the influence of polarization changes of the single-mode fiber on the interference, and is thus particularly suitable for long-distance distributed fiber sensing, such as for fiber communication trunks monitoring, long-distance perimeter, safety monitoring of oil and gas pipelines and other fields.

Figure 3:
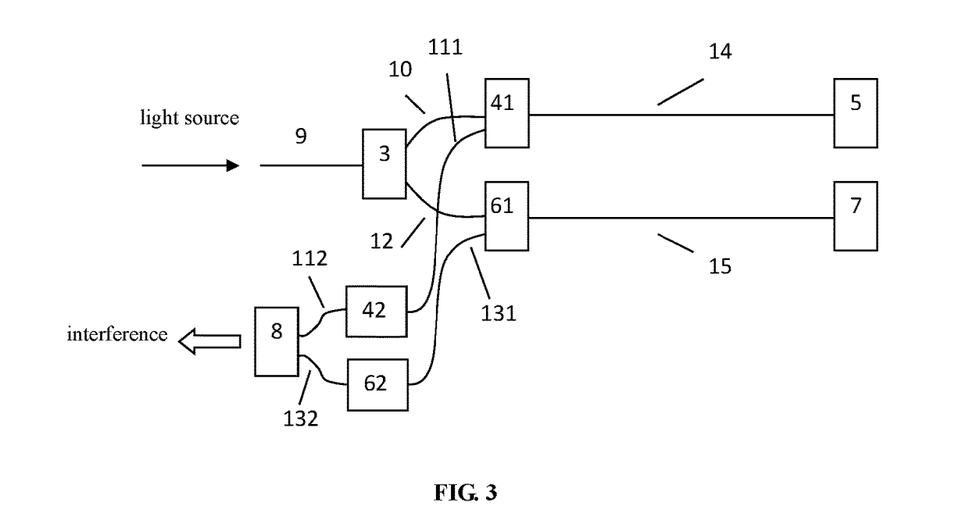
FIG. 3 is a M-Z interface light path structure with all polarization-maintaining function according to a second embodiment of the present invention.

FIG. 3 is a M-Z interface light path structure according to a second embodiment of the present invention. The M-Z interface light path structure shown in FIG. 3 is basically the same as the M-Z interface light path structure shown in FIG. 2 except that the polarization beam-splitting device 3 is a polarization-maintaining coupling device. Specifically, the polarization beam-splitting device 3 is a polarization-maintaining coupling device that operates in a single axis or two axes; the first polarization-maintaining-transferring device 4 includes a first polarization-maintaining circulator 41 and the first polarizer 42; and the second polarization-maintaining-transferring device 6 includes: the second polarization-maintaining circulator 61 and the second polarizer 62. A first port of the first polarization-maintaining circulator 41 receives the first polarized light output by the polarization beam-splitting device 3, a second port of the first polarization-maintaining circulator 41 is connected to the first faraday rotator mirror 5, and the third port of the first polarization-maintaining circulator 41 is connected to the first polarizer 42, and the first polarizer 42 is connected to the first port of the first polarization-maintaining coupler 8. Wherein the fiber 10 connected between the first port of the first polarization-maintaining circulator (41) and the polarization beam-splitting device (3), the fiber 111 connected between the third port of the first polarization-maintaining circulator (41) and the first polarizer (42), and the fiber 112 connected between the first polarizer (42) and the first port of the first polarization-maintaining coupler (8) are the polarization-maintaining fiber. The first port of the second polarization-maintaining circulator 61 receives the second polarized light output by the polarization beam-splitting device 3, the second port of the second polarization-maintaining circulator 61 is connected to the second faraday mirror 7, and the third port of the second polarization-maintaining circulator 61 is connected with the second polarizer 62, and the second polarizer 62 is connected with the second port of the first polarization-maintaining coupler 8, wherein the fiber 12 connected between the first port of the second polarization-maintaining circulator (61) and the polarization beam-splitting device (3), the fiber 131 connected between the third port of the second polarization-maintaining circulator (61) and the second polarizer (62), and the fiber 132 connected between the second polarizer (62) and the second port of the first polarization-maintaining coupler (8) are the polarization-maintaining fiber.

Among them, the first polarization-maintaining circulator 41 has function that light input from the first port output only from the second port, and the light input from the second port can be output only from the third port; the second polarization-maintaining circulator 61 has the function has function that the light input from the first port can be output only from the second port, the light input from the second port can be only output from the third port. The first polarizer 42 and the second polarizer 62 are used to obtain the polarized light, and filter out the stray light having different polarized direction with the polarized light.

In one embodiment, the M-Z interface light path structure further includes an injection fiber 9, the light input from the light source is linearly polarized light, the injection fiber 9 is a polarization-maintaining fiber, and the linearly polarized light is input to the polarization beam-splitting device 3 along the polarization main axis of the working main axis of the injection fiber 9, since the injection fiber 9 is the polarization-maintaining fiber, the polarization direction of the linearly polarized light in the injection fiber 9 remains unchanged.

Among them, the fiber 10, the fiber 111, the fiber 112, the fiber 12, the fiber 131, and the fiber 132 are all polarization-maintaining fibers, and therefore can maintain the polarization of the polarized light of which incident direction is the same with the polarization main axis of the fiber. The first polarized light and the second polarized light are transmitted along the polarization main axis, and if the polarization main axis in the direction of the corresponding polarization main axis is the working main axis when the first polarized light is transmitted in the fiber 10, the second polarized light is also transmitted along the working main axis in the fiber 12. The polarization state of the polarized light polarized in the direction of the working main axis is assumed to be the vertical polarization state, denoted by "⊥", and the polarization state orthogonal to the perpendicular polarization state is the horizontal polarization, which is denoted by "∥". When the first polarized light is transmitted to the first port of the first polarization-maintaining circulator 41, the first polarized light is vertically polarized. When the first polarized light is returned from the faraday rotator mirror 5 to the second port of the first polarization-maintaining circulator 41, the polarization direction of the first polarized light is rotated by 90 degrees with respect to when it is input to the first port of the first polarization-maintaining circulator 41, that is the horizontal polarization. When the first polarized light is output from the third port of the first polarization-maintaining circulator 41, the first polarized light is horizontally polarized. Similarly, when the second polarized light is transmitted to the first port of the second polarization-maintaining circulator 61, the second polarized light is vertically polarized; when the second polarized light is returned from the faraday rotatory mirror 7 to the second port of the second polarization-maintaining circulator 61, the polarization direction of the second polarized light is rotated by 90 degrees with respect to when it is input to the first polarization-maintaining circulator 41, that is, it is horizontally polarized. When the second polarized light is output from the third port of the second polarization-maintaining circulator 61, the second polarized light is horizontally polarized. The first polarized light is input to the first polarizer 42 through the fiber 111, and then input to the first polarization-maintaining coupler 8, the second polarized light is input to the second polarizer 62 through the fiber 13, and then input to the first polarization-maintaining coupler 8. So the first polarized light and the second polarized light input to the first polarization-maintaining coupler 8 have the same polarization state and are all in horizontal polarization. The first polarized light and the second polarized light interfere at the first polarization-maintaining coupler 8. The signal can be detected by the detector.

In one embodiment, in order to transmit the polarized light along the working main axis, the polarization-maintaining fiber adopt 0° or 90° polarization-maintaining fusion. Specifically, a linearly polarized light having vertically polarized is injected along a polarization main axis of a working main axis of the injection fiber 9, and the fiber 14 and the fiber 15 are single-mode fibers. The first polarization-maintaining-transferring device 4 and the second polarization-maintaining-transferring device 6 are polarization beam-splitting devices, so when the first polarized light is output from the third port of the first polarization-maintaining circulator 41, the first polarized light is horizontally polarized, so that in order to making the first polarized light always transmitted along the working main axis, the third port of the first polarization-maintaining circulator 41 and the fiber 111 adopt 90° polarization-maintaining fusion. Similarly, when the second polarized light is output from the third port of the second polarization-maintaining circulator 61, the second polarized light is horizontally polarized, so that in order to making the second polarized light always transmitted along the working main axis, the third port of the second polarization-maintaining circulator 61 and the fiber 131 adopt 90° polarization-maintaining fusion. Therefore, the first polarized light and the second polarized light input to the first polarization-maintaining coupler 8 have the same polarization state and are all vertically polarized, and the first polarized light and the second polarized light interfere at the first polarization-preventing coupler 8. Interference signal can be detected by the detector. The polarization changes of the first polarized light and the second polarized light are as follows:

I: Injection fiber 9 (⊥)→Polarization beam-splitting device 3 (⊥)→Fiber 10 (⊥)→First polarization-maintaining circulator 41 (⊥)→Fiber 14 (⊥ or random)→First faraday rotator mirror 5 (random)→Fibre 14 (random)→First polarization-maintaining circulator 41 (∥)→Fiber 111 (⊥)→First polarizer 42 (⊥)→Fiber 112 (⊥)→First polarization-maintaining coupler 8 (⊥)

II: Injection fiber 9 (⊥)→Polarization beam-splitting device 3 (⊥)→Fiber 12 (⊥)→Second polarization-maintaining circulator 61 (⊥)→Fiber 15 (twisted or random)→Second faraday rotator mirror 7 (random)→Fiber 15 (random)→Second polarization-maintaining circulator 61 (∥)→Option 131 (⊥)→Second polarizer 62 (⊥)→Fiber 132 (⊥)→First polarization-maintaining coupler 8 (⊥)

It can be seen that in the entire light transmission process, except for the light in the fiber 14, the fiber 15, the first polarization-maintaining circulator 41, and the second polarization-maintaining circulator 61, the rest of the light is transmitted along the working main axis of the polarization-maintaining fiber. It ensures that the polarization state of the light when finally returning to the first polarization-control coupler 8 is uniform; at the same time, since the single polarization state of the light at the time of convergence of the coherent light beam is ensured, the back scattered light direction from the sensor fiber path can be eliminated to some extent.

The second embodiment of the present invention uses a combination of a single-mode fiber and a faraday rotator to eliminate the effects of polarization changes on the interference of the single-mode fiber, and is therefore particularly suitable for long-distance distributed fiber sensing, such as for fiber communication trunks, monitoring, long-distance perimeter, safety monitoring of oil and gas pipelines and other fields.

Figure 4:
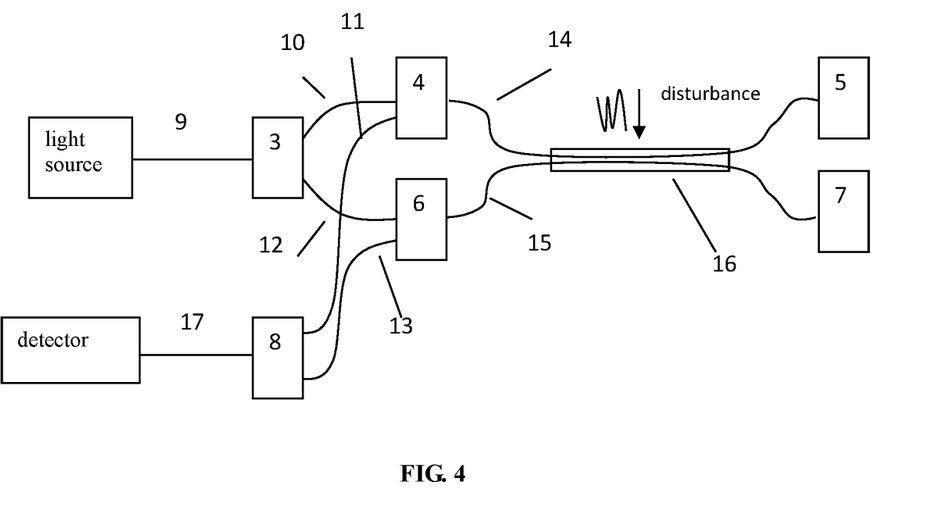
FIG. 4 is a M-Z interface light path structure with all polarization-maintaining function according to a third embodiment of the present invention.

FIG. 4 is a M-Z interface light path structure according to a third embodiment of the present invention. The structure of the M-Z interference light path shown in FIG. 4 is basically the same as the structure of the M-Z interference light path shown in FIG. 2, except that the fiber connected between the second port of the first polarization-maintaining-transferring device (4) and the first faraday rotator mirror (5), and the fiber connected between the second port of the second polarization-maintaining-transferring device (6) and the second faraday mirror (7) are wrapped by the sensor cable (16). The M-Z interface light path structure further includes a detector, and the interference signal output from the first polarization-maintaining coupler 8 through the outputting fiber 17 is detected by the detector.

Specifically, the light source is an LD light source, and the fiber 14 and the fiber 15 are single-mode fibers. When the sensing optical cable 16 is disturbed, the light path changes of the first polarized light and the second polarized light on the fiber 14 and the fiber 15 are caused. Through interference, the light path change can be transformed into the change of the interference light intensity, so that the detector detects the corresponding interference output through the outputting fiber 17 to realize the monitoring of the line disturbance situation, such as applicable to the deployment of the sensor cable 16 on the perimeter fence. Experiments show that the system is not affected by the polarization state of the single-mode fiber and the fringe resolution is close to 100%.

The third embodiment of the present invention uses a combination of a single-mode fiber and a faraday rotator mirror to eliminate the effects of polarization changes on the interference of the single-mode fiber, and thus is particularly suitable for long-distance distributed fiber sensing, such as for fiber communication trunk lines, monitoring, long-distance perimeter, safety monitoring of oil and gas pipelines and other fields.

The above-described embodiments merely illustrate the principles of the present application and its effects, and are not intended to limit the present application. Any person skilled in the art can modify or change the above embodiments without departing from the spirit and scope of the present application. Therefore, all equivalent modifications or changes made by persons of ordinary skill in the art without departing from the spirit and technical thought disclosed in the present application shall still be covered by the claims of the present application.

INDUSTRIAL APPLICABILITY

The invention provides an MZ interference optical path structure having full polarization-maintaining function, which has the following beneficial effects:

(1) Using the characteristics of the polarization-maintaining optical fiber device, in the case where a single mode optical fiber exists in the interference optical path, MZ optical path structure having full polarization-maintaining function;

(2) The coherent beam has high polarization uniformity and high interference fringe definition, which can achieve high measurement sensitivity and accuracy.

(3) The interference beam adopts a single polarization mode of operation, which can eliminate the influence of backscattered light in the fiber path to some extent;

(4) Due to the use of single-mode fiber, single-mode fiber can be used as the sensing fiber. In particular, it can be sensed by using the laid communication cable, which has strong applicability and is easy to be popularized and applied.

The invention is particularly suitable for long-distance distributed optical fiber sensing, for example, for monitoring of optical fiber communication trunks, long-distance perimeter, security monitoring of oil and natural gas pipelines, and the like.

What is claimed is:

1. A M-Z interface light path structure with an all polarization-maintaining function, comprising a polarization beam-splitting device, a first polarization-maintaining-transferring device, a first faraday rotator mirror, and a second polarization-maintaining-transferring device, a second faraday rotator mirror, a first polarization-maintaining coupler;

the polarization beam-splitting device configured to receive light input by a light source and output a first polarized light and a second polarized light with the same polarization state;

the first polarization-maintaining-transferring device comprising a first port, a second port, and a third port, the first port of the first polarization-maintaining-transferring device receiving the first polarized light output by the polarization beam-splitting device, the second port of the first polarization-maintaining-transferring device is connected to the first faraday rotator mirror, and the third port of the first polarization-maintaining-transferring device connected to a first port of the first polarization-maintaining coupler, wherein fiber connected between the first port of the first polarization-maintaining-transferring device and the polarization beam-splitting device, and fiber connected between the third port of the polarization-maintaining-transferring device and the first port of the first polarization-maintaining coupler are polarization-maintaining fiber;

the second polarization-maintaining-transferring device comprising a first port, a second port, and a third port, and the first port of the second polarization-maintaining-transferring device receiving the second polarized light output by the polarization beam-splitting device, the second port of the second polarization-maintaining-transferring device connected to the second faraday rotator mirror, and the third port of the second polarization-maintaining-transferring device connected to a second port of the first polarization-maintaining coupler, wherein fiber connected between the first port of the second polarization-maintaining-transferring device and the polarization beam-splitting device, and fiber connected between the third port of the polarization-maintaining-transferring device and the second port of the first polarization-maintaining coupler are polarization-maintaining fiber.

2. The M-Z interface light path structure with all polarization-maintaining function according to claim 1, wherein the first polarization-maintaining coupler is two or more polarization-maintaining fiber coupler.

3. The M-Z interface light path structure with all polarization-maintaining function according to claim 1, wherein the polarization beam-splitting device is a polarization-maintaining beam-splitting device.

4. The M-Z interface light path structure with all polarization-maintaining function according to claim 1, wherein the polarization beam-splitting device is a polarization-maintaining coupling device.

5. The M-Z interface light path structure with all polarization-maintaining function according to claim 4, wherein the polarization beam-splitting device is a polarization-maintaining coupling device working in a single axis or two axes.

6. The M-Z interface light path structure with all polarization-maintaining function according to claim 1, wherein both the first polarization-maintaining-transferring device and the second polarization-maintaining-transferring device are polarization beam-splitting devices, the first port and the third port of the first polarization-maintaining-transferring device are demultiplexing ports, and the second port of the first polarization-maintaining-transferring device is a multiplexing port, the first port and the third port of the second polarization-maintaining-transferring device are demultiplexing ports, and the second port of the second polarization-maintaining-transferring device is a demultiplexing port.

7. The M-Z interface light path structure with all polarization-maintaining function according to claim 1, wherein the first polarization-maintaining-transferring device and the second polarization-maintaining-transferring device both adopt 90° polarization-maintaining fusion.

8. The M-Z interface light path structure with all polarization-maintaining function according to claim 1, wherein the first polarization-maintaining-transferring device comprises a first polarization-maintaining circulator and a first polarizer, a first port of the first polarization-maintaining circulator receives the first polarized light output by the polarization beam-splitting device, and a second port of the first polarization-maintaining circulator is connected to the first faraday rotator mirror, and a third port of the first polarization-maintaining circulator is connected to the first polarizer, the first polarizer is connected to the first port of the first polarization-maintaining coupler, wherein fiber connected between the first port of the first polarization-maintaining circulator and the polarization beam-splitting device, fiber connected between the third port of the first polarization-maintaining circulator and the first polarizer, and fiber connected between the first polarizer and the first port of the first polarization-maintaining coupler are the polarization-maintaining fiber;

the second polarization-maintaining-transferring device comprises a second polarization-maintaining circulator, a second polarizer, and a first port of the second polarization-maintaining circulator receives the second polarized light output by the polarization beam-splitting light device, a second port of the second polarization-maintaining circulator is connected to the second faraday rotator mirror, and a third port of the second polarization-maintaining circulator is connected to the second polarizer, and the second polarizer is connected to the second port of the first polarization-maintaining coupler, wherein fiber connected between the first port of the second polarization-maintaining circulator and the polarization beam-splitting device, fiber connected between the third port of the second polarization-maintaining circulator and the second polarizer, and fiber connected between the second polarizer and the second port of the first polarization-maintaining coupler are the polarization-maintaining fiber.

9. The M-Z interface light path structure with all polarization-maintaining function according to claim 1, wherein fiber connected between the second port of the first polarization-maintaining-transferring device and the first faraday rotator mirror, fiber connected between the second port of the second polarization-maintaining-transferring device and the second faraday mirror are wrapped by sensor cable.

10. The M-Z interface light path structure with all polarization-maintaining function according to claim 1, wherein the M-Z interface light path structure further comprises an injection fiber, the light input by the light source is linearly polarized light, the injection fiber is a polarization-maintaining fiber, and the linearly polarized light is input to the polarization beam-splitting device along the polarization main axis of the working main axis of the injection fiber.

11. The M-Z interface light path structure with all polarization-maintaining function according to claim 10, wherein the polarization beam-splitting device is a polarization-maintaining beam-splitting device.

12. The M-Z interface light path structure with all polarization-maintaining function according to claim 10, wherein the polarization beam-splitting device is a polarization-maintaining coupling device.

13. The M-Z interface light path structure with all polarization-maintaining function according to claim 10, wherein both the first polarization-maintaining-transferring device and the second polarization-maintaining-transferring device are polarization beam-splitting devices, the first port and the third port of the first polarization-maintaining-transferring device are demultiplexing ports, and the second port of the first polarization-maintaining-transferring device is a multiplexing port, the first port and the third port of the second polarization-maintaining-transferring device are demultiplexing ports, and the second port of the second polarization-maintaining-transferring device is a demultiplexing port.

14. The M-Z interface light path structure with all polarization-maintaining function according to claim 10, wherein the first polarization-maintaining-transferring device and the second polarization-maintaining-transferring device both adopt 90° polarization-maintaining fusion.

15. The M-Z interface light path structure with all polarization-maintaining function according to claim 10, wherein the first polarization-maintaining-transferring device comprises a first polarization-maintaining circulator and a first polarizer, a first port of the first polarization-maintaining circulator receives the first polarized light output by the polarization beam-splitting device, and a second port of the first polarization-maintaining circulator is connected to the first faraday rotator mirror, and a third port of the first polarization-maintaining circulator is connected to the first polarizer, the first polarizer is connected to the first port of the first polarization-maintaining coupler, wherein fiber connected between the first port of the first polarization-maintaining circulator and the polarization beam-splitting device, fiber connected between the third port of the first polarization-maintaining circulator and the first polarizer, and fiber connected between the first polarizer and the first port of the first polarization-maintaining coupler are the polarization-maintaining fiber;

the second polarization-maintaining-transferring device comprises a second polarization-maintaining circulator, a second polarizer, and a first port of the second polarization-maintaining circulator receives the second polarized light output by the polarization beam-splitting light device, a second port of the second polarization-maintaining circulator is connected to the second faraday rotator mirror, and a third port of the second polarization-maintaining circulator is connected to the second polarizer, and the second polarizer is connected to the second port of the first polarization-maintaining coupler, wherein fiber connected between the first port of the second polarization-maintaining circulator and the polarization beam-splitting device, fiber connected between the third port of the second polarization-maintaining circulator and the second polarizer, and fiber connected between the second polarizer and the second port of the first polarization-maintaining coupler are the polarization-maintaining fiber.

16. The M-Z interface light path structure with all polarization-maintaining function according to claim 10, wherein fiber connected between the second port of the first polarization-maintaining-transferring device and the first faraday rotator mirror, fiber connected between the second port of the second polarization-maintaining-transferring device and the second faraday mirror are wrapped by sensor cable.

17. The M-Z interface light path structure with all polarization-maintaining function according to claim 10, wherein the first polarization-maintaining coupler is two or more polarization-maintaining fiber coupler.

* * * * *